(12) United States Patent
Lu

(10) Patent No.: US 11,577,645 B2
(45) Date of Patent: *Feb. 14, 2023

(54) VEHICULAR VISION SYSTEM WITH IMAGE MANIPULATION

(71) Applicant: MAGNA ELECTRONICS INC., Auburn Hills, MI (US)

(72) Inventor: Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,121

(22) Filed: Feb. 22, 2021

(65) Prior Publication Data

US 2021/0178970 A1 Jun. 17, 2021

Related U.S. Application Data

(63) Continuation of application No. 16/699,900, filed on Dec. 2, 2019, now Pat. No. 10,926,702, which is a
(Continued)

(51) Int. Cl.
*B60R 1/00* (2022.01)

(52) U.S. Cl.
CPC .......... *B60R 1/00* (2013.01); *B60R 2300/305* (2013.01); *B60R 2300/306* (2013.01);
(Continued)

(58) Field of Classification Search
CPC ................ B60R 1/00; B60R 2300/305; B60R 2300/306; B60R 2300/802; B60R 2300/8066; B60R 2300/8093
(Continued)

(56) References Cited

U.S. PATENT DOCUMENTS 4,891,559 A 1/1990 Matsumoto et al.
4,961,625 A 10/1990 Wood et al.
(Continued)

FOREIGN PATENT DOCUMENTS

DE 102010038825 A1 * 2/2011 ............... B60R 1/00
WO 2011014497 A1 2/2011
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Christopher S Kelley
*Assistant Examiner* — Kathleen M Walsh
(74) *Attorney, Agent, or Firm* — Honigman LLP

(57) ABSTRACT

A vehicular vision system includes a camera disposed at a front portion of a vehicle, a display screen and a processor for processing image data captured by the camera. The processor performs first, second and third image manipulations on first, second and third portions of the image data to generate first, second and third region manipulated image data. The display screen displays first, second and third images derived from the manipulated image data at respective display regions. The displayed images are discontinuous at a first seam between first and second display regions and discontinuous at a second seam between first and third display regions. An object present in first and second regions of the view of the camera is displayed as discontinuous at the first seam and an object present in the first and third regions of the view of the camera is displayed as discontinuous at the second seam.

30 Claims, 11 Drawing Sheets

Related U.S. Application Data continuation of application No. 14/377,940, filed as application No. PCT/US2013/027342 on Feb. 22, 2013, now Pat. No. 10,493,916.

(60) Provisional application No. 61/601,669, filed on Feb. 22, 2012.

(52) U.S. Cl.
CPC . *B60R 2300/802* (2013.01); *B60R 2300/8066* (2013.01); *B60R 2300/8093* (2013.01)

(58) Field of Classification Search
USPC .......................................................... 348/148
See application file for complete search history.

(56) References Cited

U.S. PATENT DOCUMENTS

| | | |
|---|---|---|
| 4,966,441 A | 10/1990 | Conner |
| 4,967,319 A | 10/1990 | Seko |
| 4,970,653 A | 11/1990 | Kenue |
| 5,003,288 A | 3/1991 | Wilhelm |
| 5,096,287 A | 3/1992 | Kakinami et al. |
| 5,166,681 A | 11/1992 | Bottesch et al. |
| 5,245,422 A | 9/1993 | Borcherts et al. |
| 5,313,072 A | 5/1994 | Vachss |
| 5,355,118 A | 10/1994 | Fukuhara |
| 5,359,666 A | 10/1994 | Nakayama et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,638,116 A | 6/1997 | Shimoura et al. |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Feder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,904,725 A | 5/1999 | Iisaka et al. |
| 5,914,815 A | 6/1999 | Bos |
| 5,920,367 A | 7/1999 | Kajimoto et al. |
| 5,923,027 A | 7/1999 | Stam et al. |
| 5,959,555 A | 9/1999 | Furuta |
| 5,963,247 A | 10/1999 | Banitt |
| 5,964,822 A | 10/1999 | Alland et al. |
| 5,990,469 A | 11/1999 | Bechtel et al. |
| 5,990,649 A | 11/1999 | Nagao et al. |
| 6,009,336 A | 12/1999 | Harris et al. |
| 6,020,704 A | 2/2000 | Buschur |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,139,172 A | 10/2000 | Bos et al. |
| 6,144,022 A | 11/2000 | Tenenbaum et al. |
| 6,158,655 A | 12/2000 | DeVries, Jr. et al. |
| 6,175,300 B1 | 1/2001 | Kendrick |
| 6,201,642 B1 | 3/2001 | Bos |
| 6,226,061 B1 | 5/2001 | Tagusa |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |

(56) References Cited

U.S. PATENT DOCUMENTS

| | | |
|---|---|---|
| 6,313,454 B1 | 11/2001 | Bos et al. |
| 6,317,057 B1 | 11/2001 | Lee |
| 6,320,282 B1 | 11/2001 | Caldwell |
| 6,333,759 B1 | 12/2001 | Mazzilli |
| 6,359,392 B1 | 3/2002 | He |
| 6,370,329 B1 | 4/2002 | Feuchert |
| 6,396,397 B1 | 5/2002 | Bos et al. |
| 6,411,328 B1 | 6/2002 | Franke et al. |
| 6,424,273 B1 | 7/2002 | Gulla et al. |
| 6,430,303 B1 | 8/2002 | Naoi et al. |
| 6,433,817 B1 | 8/2002 | Guerra |
| 6,442,465 B2 | 8/2002 | Breed et al. |
| 6,485,155 B1 | 11/2002 | Duroux et al. |
| 6,497,503 B1 | 12/2002 | Dassanayake et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,610 B1 | 8/2003 | Stam et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,693,524 B1 | 2/2004 | Payne |
| 6,700,605 B1 | 3/2004 | Toyoda et al. |
| 6,704,621 B1 | 3/2004 | Stein et al. |
| 6,711,474 B1 | 3/2004 | Freyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,744,353 B2 | 6/2004 | Sjonell |
| 6,757,109 B2 | 6/2004 | Bos |
| 6,762,867 B2 | 7/2004 | Lippert et al. |
| 6,795,221 B1 | 9/2004 | Urey |
| 6,806,452 B2 | 10/2004 | Bos et al. |
| 6,807,287 B1 | 10/2004 | Hermans |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 7,004,593 B2 | 2/2006 | Weller et al. |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,133,661 B2 | 11/2006 | Hatae et al. |
| 7,149,613 B2 | 12/2006 | Stam et al. |
| 7,151,996 B2 | 12/2006 | Stein |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,375,803 B1 | 5/2008 | Bamji |
| 7,423,821 B2 | 9/2008 | Bechtel et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,786,898 B2 | 8/2010 | Stein et al. |
| 7,843,451 B2 | 11/2010 | Lafon |
| 7,855,778 B2 | 12/2010 | Yung et al. |
| 7,881,496 B2 | 2/2011 | Camilleri et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 8,736,680 B1 | 5/2014 | Cilia et al. |
| 10,493,916 B2 * | 12/2019 | Lu ............................. B60R 1/00 |
| 10,926,702 B2 * | 2/2021 | Lu ............................. B60R 1/00 |
| 2001/0002451 A1 | 5/2001 | Breed |
| 2002/0005778 A1 | 1/2002 | Breed et al. |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0122930 A1 | 7/2003 | Schofield et al. |
| 2003/0137586 A1 | 7/2003 | Lewellen |
| 2003/0222982 A1 | 12/2003 | Hamdan et al. |
| 2004/0046889 A1 * | 3/2004 | Imoto ....................... B60R 1/00 348/E7.087 |
| 2004/0164228 A1 | 8/2004 | Fogg et al. |
| 2005/0174429 A1 | 8/2005 | Yanai |
| 2005/0219852 A1 | 10/2005 | Stam et al. |
| 2005/0237385 A1 | 10/2005 | Kosaka et al. |
| 2006/0017807 A1 * | 1/2006 | Lee ................... H04N 5/232945 348/E7.086 |
| 2006/0018511 A1 | 1/2006 | Stam et al. |
| 2006/0018512 A1 | 1/2006 | Stam et al. |
| 2006/0029255 A1 | 2/2006 | Ozaki |
| 2006/0088190 A1 | 4/2006 | Chinomi |
| 2006/0091813 A1 | 5/2006 | Stam et al. |
| 2006/0103727 A1 | 5/2006 | Tseng |
| 2006/0125919 A1 | 6/2006 | Camilleri et al. |
| 2006/0192660 A1 * | 8/2006 | Watanabe ................. B60R 1/00 348/E7.086 |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0117287 A1 | 5/2008 | Park et al. |
| 2008/0147321 A1 | 6/2008 | Howard et al. |
| 2008/0192132 A1 | 8/2008 | Bechtel et al. |
| 2008/0231710 A1 | 9/2008 | Asari et al. |
| 2008/0246843 A1 * | 10/2008 | Nagata ..................... B60R 1/00 348/E7.086 |
| 2008/0266396 A1 | 10/2008 | Stein |
| 2009/0079553 A1 * | 3/2009 | Yanagi ..................... B60R 1/00 340/435 |
| 2009/0079585 A1 | 3/2009 | Chinomi et al. |
| 2009/0113509 A1 | 4/2009 | Tseng et al. |
| 2010/0045797 A1 | 2/2010 | Schofield et al. |
| 2010/0194889 A1 | 8/2010 | Arndt et al. |
| 2010/0295945 A1 | 11/2010 | Plemons et al. |
| 2011/0122249 A1 | 5/2011 | Camilleri et al. |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0098968 A1 | 4/2012 | Schofield et al. |
| 2012/0154589 A1 * | 6/2012 | Watanabe ................. B60R 1/00 348/148 |
| 2012/0200707 A1 | 8/2012 | Stein et al. |
| 2012/0265416 A1 | 10/2012 | Lu et al. |
| 2012/0314071 A1 | 12/2012 | Rosenbaum et al. |

(56) References Cited

U.S. PATENT DOCUMENTS

| | | |
|---|---|---|
| 2012/0320209 A1 | 12/2012 | Vico et al. |
| 2013/0027558 A1 | 1/2013 | Ramanath et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0222593 A1 | 8/2013 | Byrne et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

FOREIGN PATENT DOCUMENTS

| | | | | |
|---|---|---|---|---|
| WO | WO-2011014497 A1 * | 2/2011 | ............... | B60R 1/00 |
| WO | 2011030698 A1 | 3/2011 | | |
| WO | WO-2011030698 A1 * | 3/2011 | ............... | B60R 1/00 |

OTHER PUBLICATIONS

Wolberg, Digital Image Warping, IEEE Computer Society Press, 1990.

Wolberg, "A Two-Pass Mesh Warping Implementation of Morphing," Dr. Dobb's Journal, No. 202, Jul. 1993.

Praitt, "Digital Image Processing, Passage—ED.3", John Wiley & Sons, US, Jan. 1, 2001, pp. 657-659, XP002529771.

Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.

Burt et al., A Multiresolution Spline with Application to Image Mosaics, ACM Transactions on Graphics, vol. 2 No. 4, pp. 217-236, Oct. 1983.

Brown, A Survey of Image Registration Techniques, vol. 24, ACM Computing Surveys, pp. 325-376, 1992.

Broggi et al., "Multi-Resolution Vehicle Detection using Artificial Vision," IEEE Intelligent Vehicles Symposium of Jun. 2004.

Bow, Sing T., "Pattern Recognition and Image Preprocessing (Signal Processing and Communications)", CRC Press, Jan. 15, 2002, pp. 557-559.

International Search Report and Written Opinion dated Apr. 29, 2013 for corresponding PCT application No. PCT/US2013/027342.

* cited by examiner

VEHICULAR VISION SYSTEM WITH IMAGE MANIPULATION

CROSS REFERENCE TO RELATED APPLICATIONS

The present application is a continuation of U.S. patent application Ser. No. 16/699,900, filed Dec. 2, 2019, now U.S. Pat. No. 10,926,702, which is a continuation of U.S. patent application Ser. No. 14/377,940, filed Aug. 11, 2014, now U.S. Pat. No. 10,493,916, which is a 371 national phase filing of PCT Application No. PCT/US2013/027342, filed Feb. 22, 2013, which claims the filing benefit of U.S. provisional application Ser. No. 61/601,669, filed Feb. 22, 2012, which is hereby incorporated herein by reference in its entirety.

FIELD OF THE INVENTION

This disclosure relates to vehicle vision systems and, more particularly, to a vehicle vision system that displays images derived from image data captured by one or more vehicle cameras.

BACKGROUND OF THE INVENTION

Vehicle camera systems can provide vehicle operators with valuable information about driving conditions. For example, a typical vehicle camera system can aid a driver in parking her automobile by alerting her to hazards around her automobile that should be avoided. Other uses for vehicle camera system are also known. However, a typical vehicle camera system may not be able to provide video that is quickly and reliably comprehensible to the driver.

SUMMARY OF THE INVENTION

The present invention provides a vision system having a camera that captures image data representative of a scene exterior of a vehicle equipped with the vision system. Different regions of the image data captured by a single vehicular camera can be manipulated by different image manipulation techniques before the captured image is displayed at a display for viewing by a driver of the equipped vehicle.

These and other objects, advantages, purposes and features of the present invention will become apparent upon review of the following specification in conjunction with the drawings.

BRIEF DESCRIPTION OF THE DRAWINGS

The drawings illustrate, by way of example only, embodiments of the present disclosure.

DESCRIPTION OF THE PREFERRED EMBODIMENTS

Figure 1:
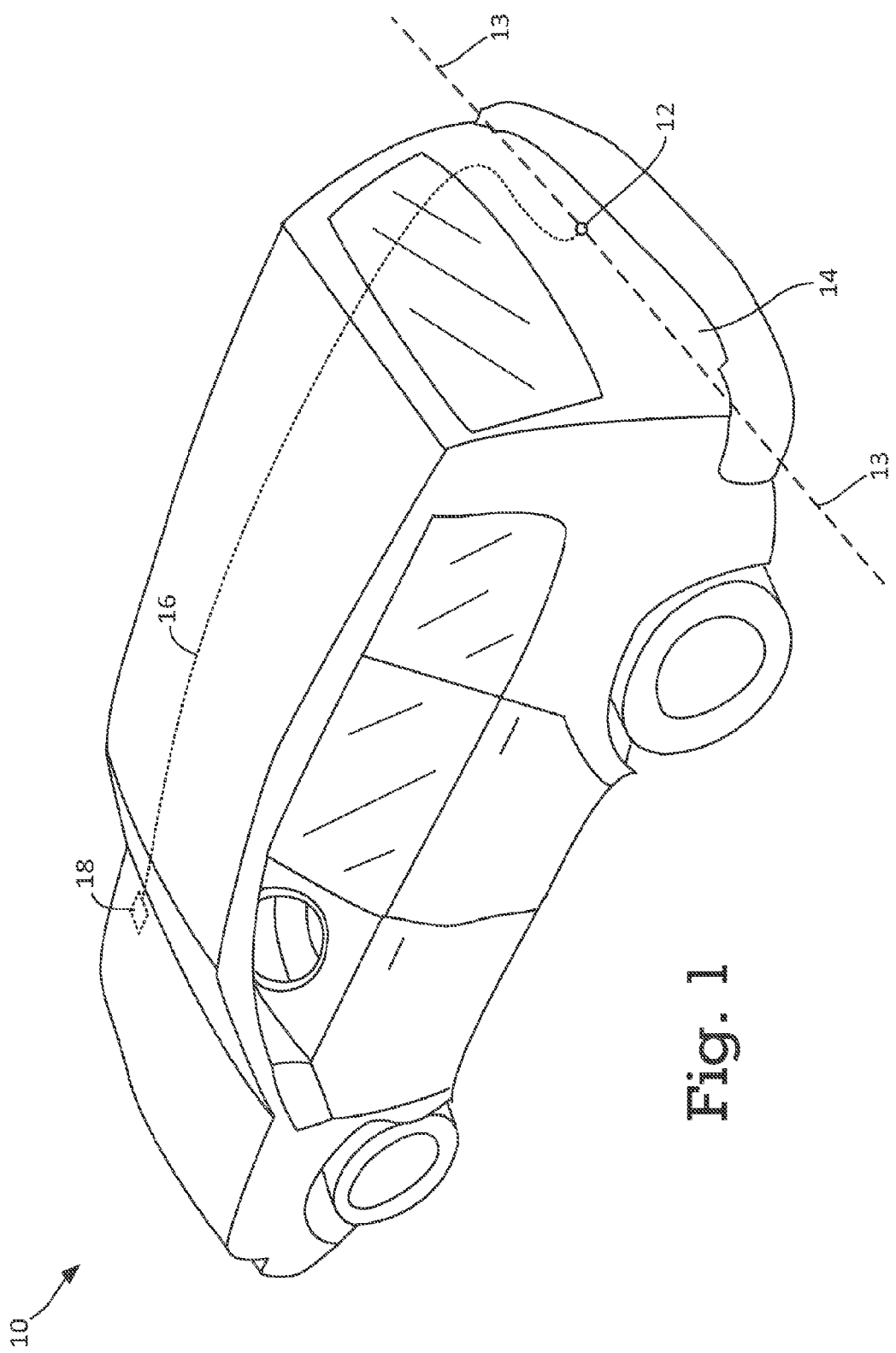
FIG. 1 is a perspective view of a vehicle having a vehicle camera system.

Referring now to the drawings and the illustrative embodiments depicted therein, and with reference to FIG. 1, a vehicle 10, such as a car, truck, van, bus, or other type of vehicle, includes a camera 12. The camera 12 is configured to be positioned on the vehicle 12 to face away from the bulk of the body 14 of the vehicle 10 to capture video of the environment outside of the vehicle 10 to, for example, aid the operator of the vehicle 10, such as, for example, when executing a reversing maneuver or a parking maneuver of the vehicle.

In this example, the camera 12 is positioned at a rear-portion of the body 14 of the vehicle 10 and is rear-facing to capture video of the scene behind the vehicle 12. In another example, the camera 12 can be positioned at a rear bumper of the vehicle 10. In still other examples, the camera can be forward-facing and can be positioned, for example, at the front windshield, at the rear-view mirror, or at the grille of the vehicle 10. For example, the camera may comprise a forward facing camera, such as for assisting the driver of the vehicle during forward parking maneuvers and/or to detect cross traffic at intersections and parking lots and the like. Optionally, the camera may be part of a multi-camera system of the vehicle, such as for a surround view or top-down view system of the vehicle or the like, such as discussed below.

The camera 12 is a single imager or camera comprising a single photosensor array, and the camera may include a wide-angle lens, such as a lens with a horizontal field of view of at least about 120 degrees to about 180 degrees or more than about 180 degrees. In this way, the camera 12 can capture the scene directly behind or ahead of the vehicle 10 as well as areas to the right and left of the vehicle 10. When the camera 12 is rear-facing and has a lens with a horizontal field of view of more than about 180 degrees, the horizontal extents of the field of view of the camera 12 are shown at 13 in FIG. 1. Such a field of view can encompass a wide range of potential hazards including objects directly in the vehicle's rear path of travel, objects in rear blind spots, as well as objects at a distance to the far left and far right of the vehicle 10, such as an approaching vehicle on a perpendicular path of travel. A similar field of view may be established when the camera 12 is a forward-facing camera disposed at a front portion of the vehicle. Optionally, the processor may be part of the camera or camera module or may be separate from the camera. Optionally, the processor may receive other image data, such as image data captured by one or more other cameras of a multi-camera system of the vehicle.

The camera 12 is coupled via a line 16 (such as, for example, conductive wires) to a controller 18 located at a forward portion of the vehicle 10, such as under the hood or below the dash. In other examples, the camera 12 can be coupled to the controller 18 via a wireless communications technique instead of via the line 16. Moreover, the controller 18 can be positioned elsewhere in the vehicle 10. The controller may also be inside the camera 12 or incorporated into the camera or camera module. The processor in the controller may comprise any suitable processing device, such as an ASIC, a digital signal processor (DSP), a FPGA, a system-on-chip (SOC), or any other suitable digital processing unit. The controller also includes a video signal generator/converter, which converts video image data from digital data format to output video format, such as NTSC analog video, LVDS digital video, MOST digital video or Ethernet digital video format or the like.

Figure 2:
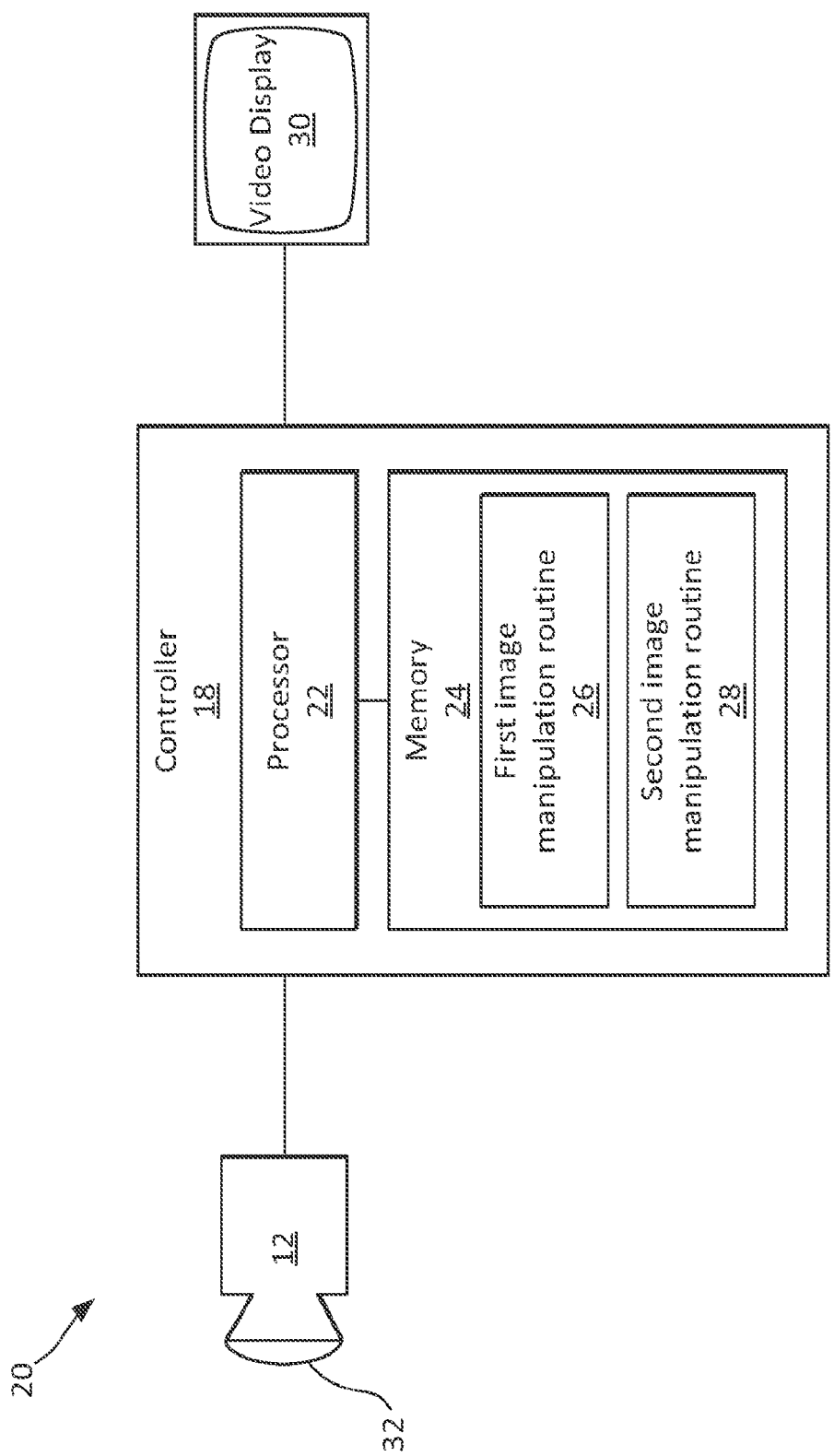
FIG. 2 is a functional block diagram of the vehicle camera system.

As shown in FIG. 2, the camera 12 and controller 18 can form at least part of a vehicle camera system 20. The vehicle camera system 20 is described herein as capturing images and video, and captured images can be considered, for explanatory purposes, frames of captured video.

The controller 18 includes a processor 22 and connected memory 24. The controller 18 is operatively coupled to both the camera 12, as mentioned above, and to a display 30.

The display 30 is configured to be positioned inside the cabin of the vehicle 10. The display 30 is coupled to the controller 18 by way of, for example, conductive lines. The display 30 can include an in-vehicle display panel situated in the dash of the vehicle 10. The display 30 can include a liquid-crystal display (LCD) panel, a light-emitting diode (LED) display panel, an active-matrix organic LED (AMO-LED) display panel, or the like, as well as a circuit to drive the display panel with a video signal received from the controller 18. The display 30 can include a touch-screen interface to control how the video is displayed by, for example, outputting a mode signal to the controller 18.

The processor 22 can execute program code stored in the memory 24. The memory 24 can store program code, such as a first image manipulation routine 26 and a second image manipulation routine 28. As will be discussed in detail below, the processor 22 can be configured by the first and second image manipulation routines 26, 28 to manipulate an image received from the camera 12 to generate a manipulated image. The first and second image manipulation routines 26, 28 are different, such as different types of processing, so that pixels of one region of the image are manipulated by a different manipulation than pixels of another region of the image. Performing such manipulations to a consecutive series of images captured by the camera 12 results in manipulated video being displayed on the display 30 to aid the driver in operating the vehicle 10.

The image processing or manipulation may be performed on any given frame of captured image data or a series of frames of captured image data or intervals or sequences of frames or the like of captured image data. For example, the camera may be operable to capture frames of image data at a rate of about 15 frames per second or about 30 frames per second or more, and the system may be operable to manipulate the image data of each frame of captured image data, or optionally every other frame of captured image data or every third frame of captured image data or the like may be processed and manipulated (depending on the particular application of the system) in accordance with the present invention.

The first image manipulation routine 26 includes instructions executable by the processor 22 to perform a first image manipulation on a first region of an image. The first image manipulation routine 26 can define the first region of the image as well as the first image manipulation to be performed on the first region. The first region can be defined by a first set of coordinates of a first set of pixels, one or more boundaries or partitions that fence in a first set of pixels, or the like.

Similarly, the second image manipulation routine 28 includes instructions executable by the processor 22 to perform a second image manipulation on a second region of an image. The second image manipulation routine 26 can define the second region of the image as well as the second image manipulation to be performed on the second region. The second region can be defined by a second set of coordinates of a second set of pixels, one or more boundaries or partitions that fence in a second set of pixels, or the like.

Selection of the two or more regions (such as by partitioning the captured image into a plurality of distinct regions, such as a left region and a right region or such as a center region and left region and right region or the like) may be a predetermined or preset decision based on the known field of view optics/parameters of a given camera at a given location at a vehicle (such as a rearward facing camera at the rear of the vehicle) or may be dynamically or automatically selected based at least in part on the given camera at a given location at a vehicle or the like, and/or based at least in part on the environment or lighting conditions at the scene being imaged and/or based at least in part on the type of driving maneuver being performed by the driver of the vehicle.

Each of the first and second image manipulations can be defined by one or more of a remapping table, function, algorithm, or process that acts on the respective first or second set of pixels to generate a respective first or second manipulated region. In one example, a remapping table (see FIG. 9) correlates X and Y coordinates of source pixels with X and Y coordinates of destination pixels, where color values of each source pixel are set at the X and Y coordinates of each corresponding destination pixel. In this case, the first and second image manipulation routines 26, 28 include instructions for carrying out the remapping of pixels, and can further include the remapping tables themselves. Of course, a remapping table can be stored separately in the memory 24.

In another example, a remapping function takes as input source pixel coordinates and color values and outputs destination pixel coordinates and color values. In this case, the first and second image manipulation routines 26, 28 include instructions that define the respective remapping function. Each of the first and second image manipulation routines 26, 28 can use interpolation or extrapolation to output color values for pixels that do not directly correlate to pixels in the captured image. Although interpolation or extrapolation may result in blur or an apparent loss of image fidelity, it can also result in a larger or more easily comprehensible image.

In other examples, other techniques can alternatively or additionally be used for the first and second image manipulation routines 26, 28.

The first and second image manipulations defined by the respective first and second image manipulation routines 26, 28 are different. In one example, the first image manipulation routine 26 includes dewarping instructions that, for example, flatten the first region of the image to reduce the apparent curvature in the image resulting from optical distortion causes by the wide-angle lens 32. In the same example, the second image manipulation includes reshaping instructions that reshape the second region of the image by one or more of enlarging, moving, cropping, stretching, compressing, skewing, rotating, and tilting, for example, parts of the second region or the entire second region. In addition to reshaping, the second image manipulation routine 28 can further perform dewarping in the second region, similar to that performed in the first region. The second image manipulation routine 28 can be configured to move an apparent viewpoint of the camera 12 along a path of travel of the vehicle, so that if the camera 12 is rear-facing the apparent viewpoint of the camera 12 is moved rearward, and if the camera 12 is forward-facing then the apparent viewpoint of the camera 12 is moved forward. Furthermore, although the different manipulations may comprise similar types of manipulation (such as, for example, dewarping or the like), the character or degree or technique of the particular type of manipulation (such as, for example, dewarping or the like) may be different between the two manipulations.

Similarly, a third image manipulation routine can also be stored in the memory 24. In this example, the third image manipulation routine performs the same manipulation as the second image manipulation routine but on a different, third region of the image. Third region of the image has a shape that is similar, preferably mirror-symmetric, to a shape of the second region, and accordingly, the third image manipulation routine generates a third manipulated region that has a shape that is mirror-symmetric to a shape of the second manipulated region. Accordingly, the second and third image manipulation routines can be the same routine executed with different parameters. For example, when a remapping table is referenced to generate the third manipulated region, a parameter can be used to indicate that the remapping table is to be traversed differently than when the remapping table is used to generate the second manipulated region. When a remapping function is used, the remapping function can be passed a parameter that identifies whether pixels of the second region or the third region are being remapped, so that the remapping function can operate on such pixels accordingly. However, in other examples, the third image manipulation routine can be a separate routine from the second image manipulation routine 28.

In another example, the second image manipulation routine 28 is a remapping table that includes coordinates of pixels of the second and third regions. This is analogous to the second and third regions being parts of the same discontinuous region.

In still another example, the first and second image mapping routines 26, 28 can be a single routine that applies a single remapping table to an image to generate a manipulated image. The two or more different types of manipulations performed to the two or more different regions of the image are realized by the selected coordinate values of the remapping table.

The processor 22 can be configured to generate the manipulated image based on image data received from only the camera. That is, in this example, the processor 22 does not use image data provided by other cameras, if any other cameras are provided to the vehicle 10, to carry out the image manipulations described herein.

Figure 3:
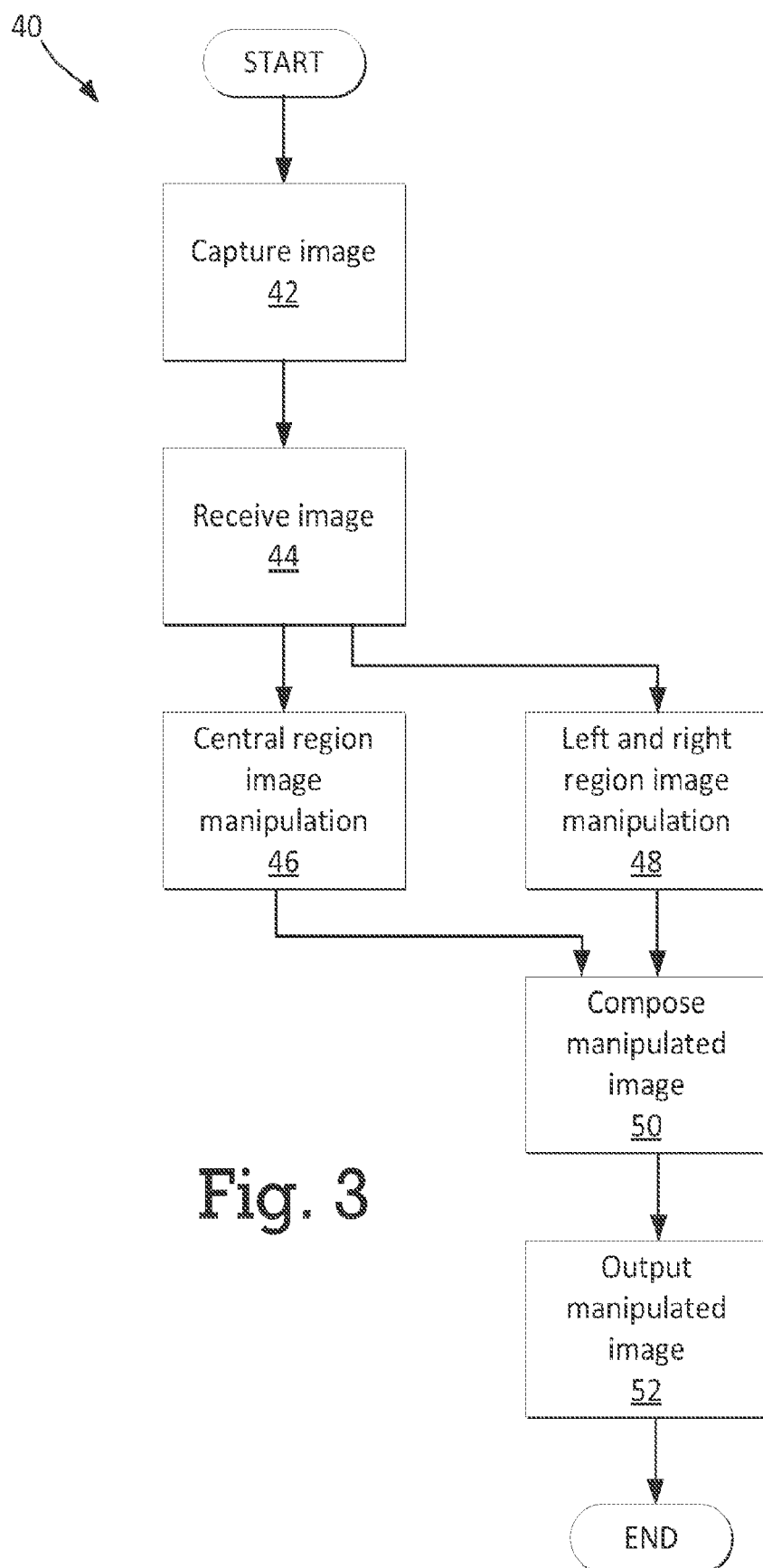
FIG. 3 is a flowchart of a method for manipulating an image captured by the vehicle camera system.
Figure 4A:
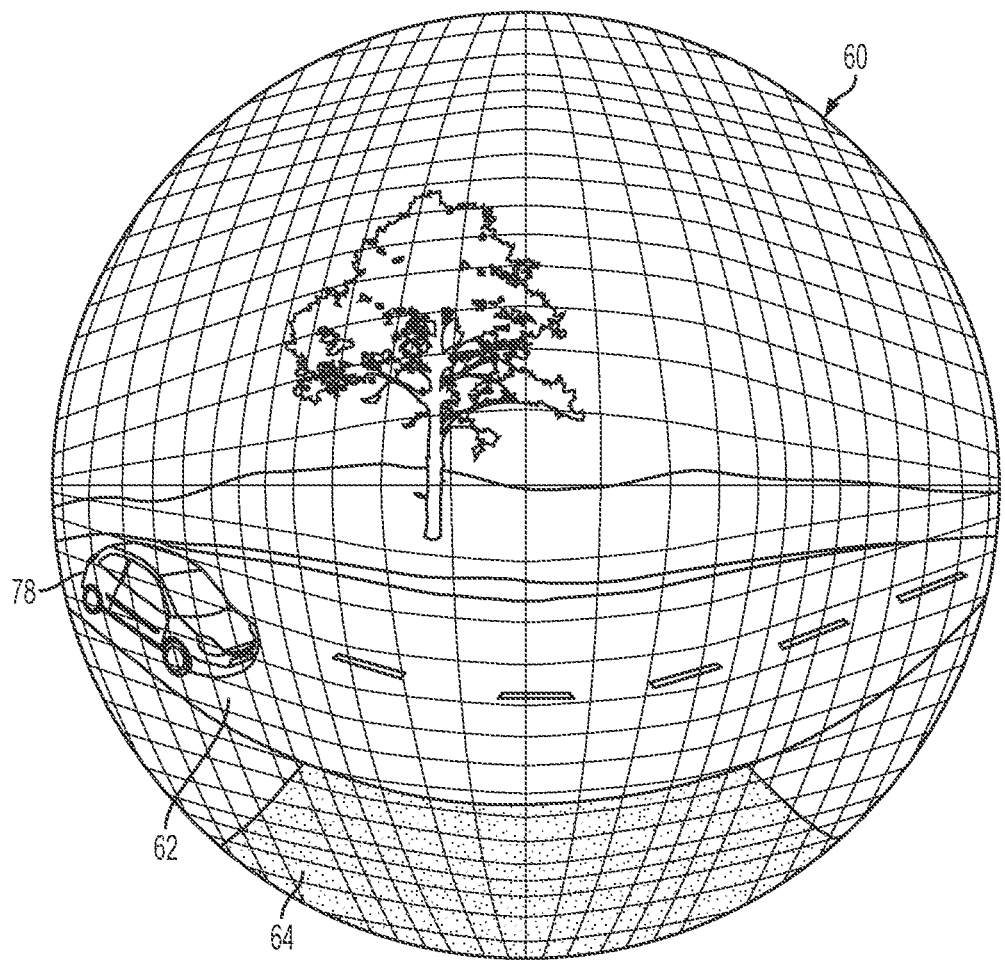
FIGS. 4A-C are diagrams showing image manipulation of an original image captured by the vehicle camera to obtain a manipulated image.

Referring to FIG. 3, a method 40 of displaying an image captured by a vehicle camera, such as the camera 12, is illustrated. The method 40 will be described in the context of the vehicle camera system 20 of FIG. 2 and can take the form of instructions executable by the processor 22 of the controller 18. The method 40 will also be described with reference to FIGS. 4A-C, which show original and manipulated images. It is noted that the gridlines in FIGS. 4A-C are intended to illustrate any warping that is present in the images and do not themselves form part of the images.

At 42, an image 60, such as a frame of video, is captured by the camera 12. FIG. 4A shows an example of the image 60 received from the camera 12 equipped with the wide-angle lens 32. Warping in the image 60 as a result of the lens 32 can be seen in the curvature of the gridlines. In the example scene, a road 62 is perpendicular to a driveway 64 that the vehicle 10 is leaving. An approaching vehicle 78 travelling on the road 62 presents a potential collision hazard to the vehicle 10.

Next, at 44, the processor 22 receives image data from the camera 12. The image data is representative of the image 60 captured by the camera 12, and may be a series of pixel color values of the image, a compressed stream of pixel color values, pixel color values of a frame of video differentially encoded with respect to a previous frame (such as, for example, an MPEG video P-frame or B-frame that refers back to a previous frame, such as an I-frame), or the like. Irrespective of the form of the image data, the processor 22 can be considered to have received the image 60 and to have access to all the pixels of the image 60 for the purposes of image manipulation.

Figure 4B:
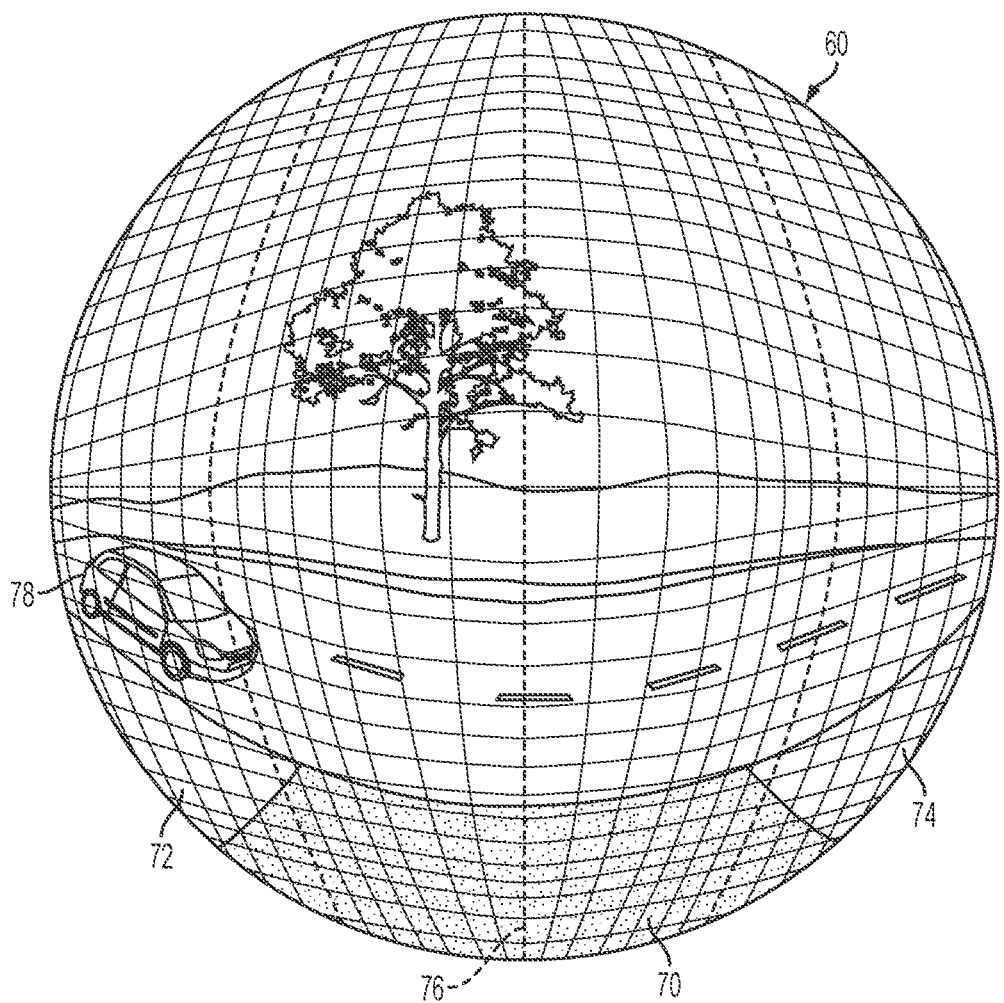
Figure 4C:
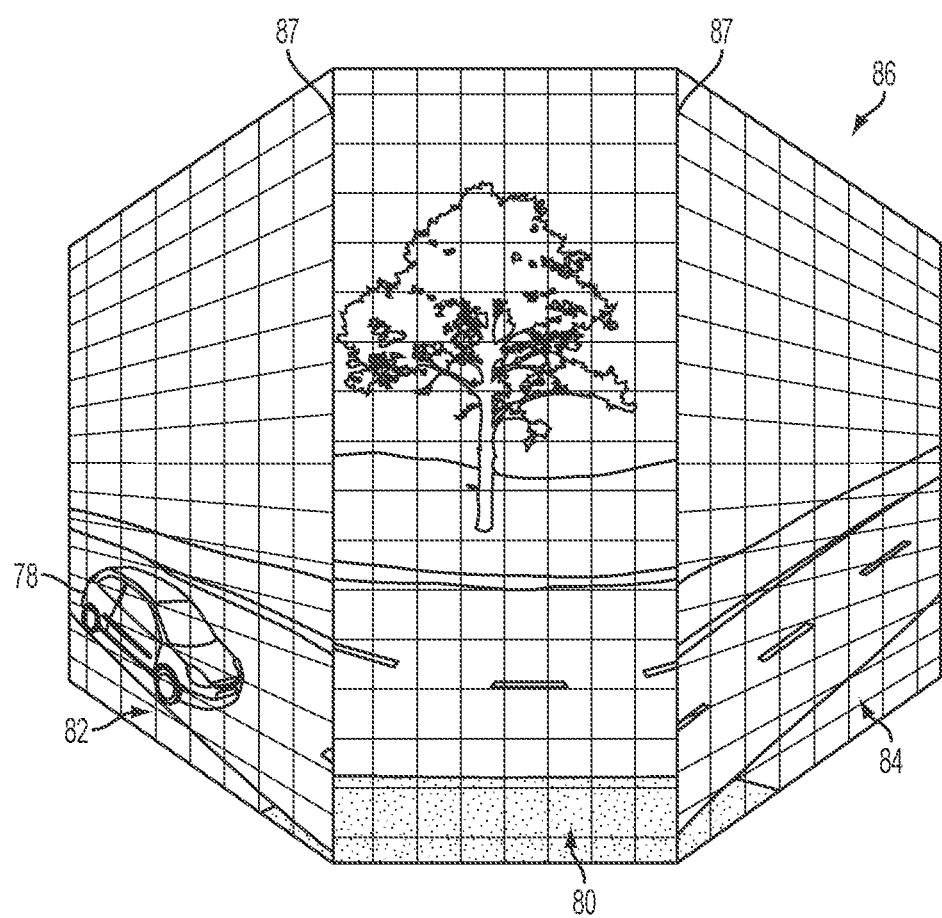

Referring to FIGS. 4B and 4C, at 46, the processor 22 performs a first image manipulation on a first region 70 of the image 60 to generate a first manipulated region 80. The first image manipulation can be defined by the first image manipulation routine 26 and can act on a first portion of the image data corresponding to the first region 70 to generate first region manipulated image data representative of a first manipulated region 80. In this example, the first region 70 is a central region 70 of the image 60, as shown in FIG. 4B. The first image manipulation routine 26 includes instructions that dewarp the central region 70 to generate central region manipulated image data representative of a central manipulated region 80, as shown in FIG. 4C. The dewarping of the central manipulated region 80 is illustratively shown as the gridlines being straightened.

At 48, the processor 22 performs second and third image manipulations on respective second and third regions 72, 74 of the image 60 to generate second and third manipulated regions 82, 84. The second and third image manipulations can be defined by the second image manipulation routine 28 (and, optionally, by the third image manipulation routine), and can act on second and third portions of the image data corresponding to the second and third regions 82, 84 to generate second and third region manipulated image data representative of respective second and third manipulated regions 82, 84. In this example, the second and third regions 72, 74 are respectively left and right region 72, 74 of the image 60, as shown in FIG. 4B. The second image manipulation routine 28 (and, if used, the third image manipulation routine) includes instructions that reshape and dewarp the left and right regions 72, 74 to generate left and right region manipulated image data representative of respective left and right manipulated regions 82, 84, as shown in FIG. 4C. The reshaping and dewarping of the left and right manipulated regions 82, 84 is illustratively shown as the gridlines being straightened and the left and right manipulated regions 82, 84 being larger and polygonal when compared to the rounded, non-manipulated left and right regions 72, 74.

In this example, the left and right regions 72, 74 are different regions that undergo the same type of manipulation, albeit in a mirror-symmetric manner about a central vertical axis 76 of the image 60. This is because the camera 12 is forward- or rear-facing and the left and right directions generally have about the same importance to the operator of the vehicle 10 when assessing potential external hazards.

Figure 8:
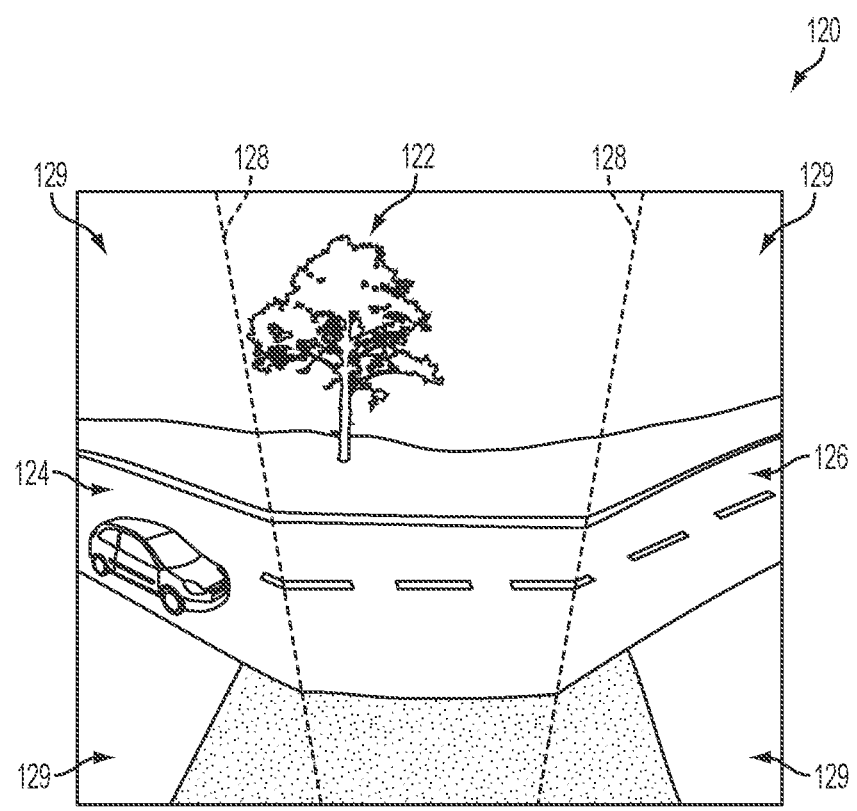
FIG. 8 is a diagram showing a manipulated image obtained by continuous dewarping and reshaping.

Next, at 50, the processor 22 composes the first (central), second (left), and third (right) manipulated regions 80, 82, 84 into the larger manipulated image 86, shown in FIG. 4C. Such composing can be inherent to the image manipulation performed at 46 and 48. It can be seen in this particular example image that the manipulated image 86 is generally or at least substantially discontinuous at seams 87 between the central manipulated region 80 and the left and right manipulated regions 82, 84, and objects in the manipulated image 86 do not line up at the seams 87. Moreover, the seams 87 can be graphically enhanced by way of the processor 22 overlaying lines or other graphical elements. It is desirable, however, in certain other applications, to have continuous stitching (such as shown in FIG. 8) between the regions 82, 80 and 84, so that there is no blind spot in the whole image coverage area or field of view of the camera or displayed portion of the field of view of the camera. This can be accomplished with proper tuning of pixel manipulation formulas for each region with the architecture and processing of the present invention.

Regarding the shape of the manipulated image 86, it can be seen that the central region 80 is rectangular while the left and right manipulated regions 82, 84 are complementary shaped trapezoids. These are merely example shapes. Other shapes of image 86 and/or other shapes of individual regions may also be possible or suitable with this architecture (such as by utilizing aspects of the vision systems described in U.S. provisional applications, Ser. No. 61/745,864, filed Dec. 26, 2012; Ser. No. 61/700,617, filed Sep. 13, 2012, and Ser. No. 61/616,855, filed Mar. 28, 2012, which are hereby incorporated herein by reference in their entireties.

Finally, at 52, the processor 22 outputs manipulated image data, including the first (central) region manipulated image data and the second and third (left and right) region manipulated image data, to the display 30 to cause the display 30 to display the manipulated image 86 to the operator of the vehicle 10.

It can be seen from FIGS. 4B and 4C that the left and right manipulated regions 82, 84 are enlarged relative to the manipulated central region 80 when compared with the original left, right, and central regions 82, 84, 80. That is, the left and right manipulated regions 82, 84 are increased in size in order to emphasize to the driver hazards or other information that may be contained in these regions. This is not to say that the central region is unimportant, but rather, referring to FIG. 4A showing the original image, that the left and right regions 72, 74 are relatively small and hazards therein may not be readily noticed by drivers. Moreover, the reshaping of the left and right regions 72, 74 can further emphasize to the driver that these regions are more lateral to the vehicle than may be apparent from the original image 60. For example, the approaching vehicle 78 in the original image 60 may have a position or may be moving in a way that is misperceived by the driver due to the distortion caused by the wide-angle lens 32. While the vehicle 78 is indeed a hazard to the driver wishing to enter the roadway 62, the distortion of the image 60 in the left region 72 may be confusing to the driver and may cause the driver to not fully realize the approaching hazard. However, the image in FIG. 4C reshapes the image of the vehicle 78 to make it larger and to emphasize that the path of the vehicle 78 will intersect with the driver's intended path of the vehicle 10. The hazard is the same, but its significance is highlighted. The second (and third) image manipulation routine 28 can be configured to highlight hazards in the left and right regions by selecting specific image manipulation techniques (such as, for example, specific kinds of reshaping) that are found to quickly and coherently inform drivers of such hazards.

In this example, image manipulation used on the left and right regions 72, 74 is one that moves an apparent viewpoint of the camera along the path of travel of the vehicle. That is, it gives the driver the impression of peeking around the corner behind (in the case of the camera 12 being rear-facing) or ahead (in the case of the camera 12 being front-facing) of the vehicle 10. Although no additional information is added to the left and right manipulated regions 82, 84 (at most, interpolation or extrapolation may be used to enlarge these regions), the reshaping performed can alter the driver's perception of these regions in a way than better alerts the driver to hazards. The presence of the seams 87, whether enhanced or not, can also contribute to increased hazard perception.

Although showing the left and right manipulated regions 82, 84 has the advantage of alerting drivers to oncoming cross-traffic or other hazards that may be obstructed by blind spots or obstacles, showing the central manipulated region 80 as well provides a further advantage even if the scene of the central region is clearly directly visible via the rear-view mirror or front windshield. This advantage is that the driver does not have to switch his/her attention between the display 30 and the rear view mirror or front windshield, and can thus observe the entire scene on the display 30.

In the examples described herein, the field of view shown on the display 30 has no gaps. More particularly, there is no gap in the field of view between the fields of view displayed in the left and right views and the central view on the in-cabin display. There is in at least some embodiments, overlap between the central view and the respective left and right views so as to ensure that the views (such as the left, right and central views) represent a continuous field of view without gaps on the display. Some known systems omit a horizontal angular region, such as the central region, in order to have more room to display left and right regions. However, omitting any such region from the display may result in a safety concern, in that the driver may not be able to properly see the omitted region by another means. Moreover, the driver may incorrectly assume that an omitted region, by virtue of its omission, is unimportant to safe operation of the vehicle. To address this, the examples described herein show a continuous horizontal field of view in one place on the display 30.

Steps of the method 40 can be performed in orders different from that described and can be aggregated together or further separated.

In another example, dewarping is performed on the entire image 60 while reshaping is only performed on the left and right regions 72, 74. This means that the first region is substantially the entire image 60 while the second and third regions are different as they are smaller regions of the full image 60. In short, the regions of the image being differently manipulated can overlap.

Figure 5:
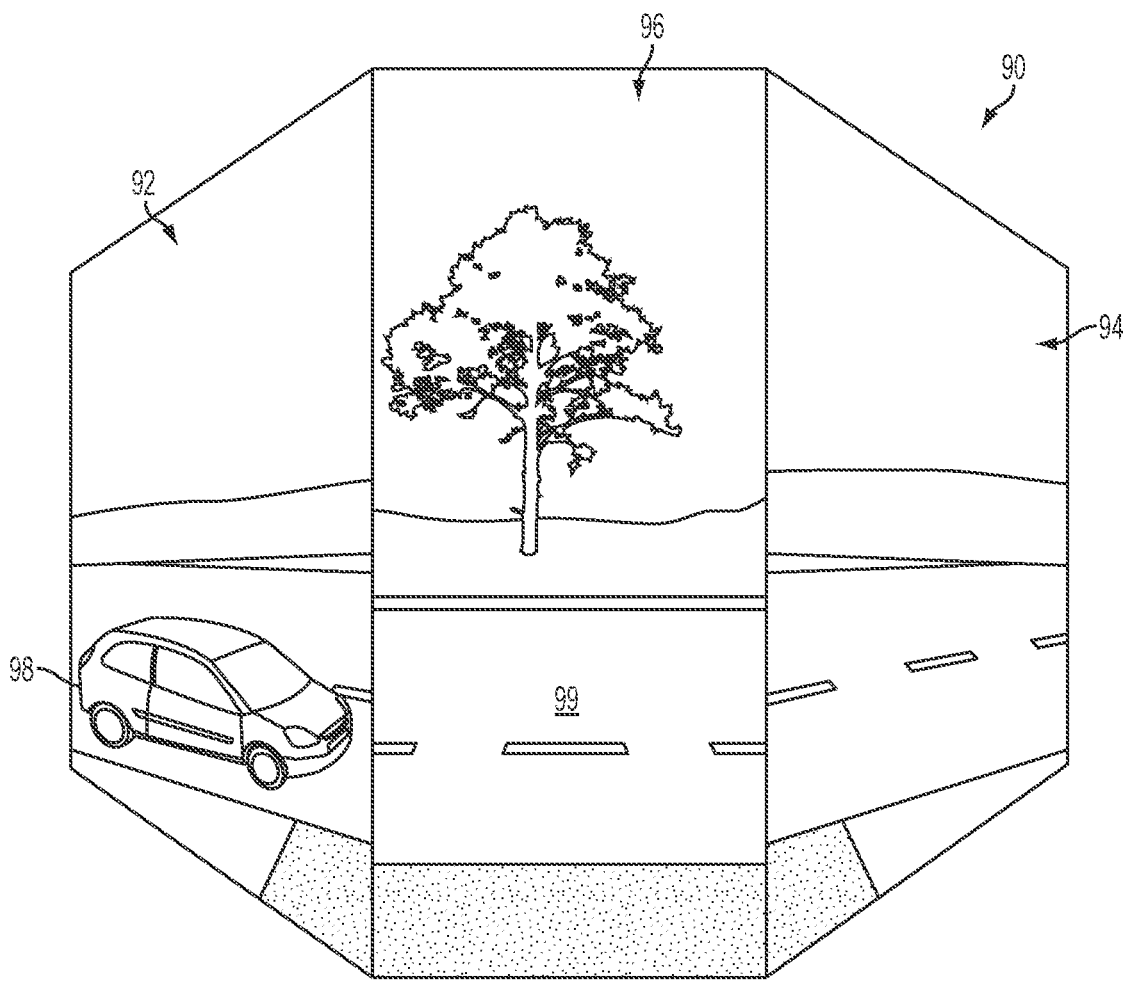
FIG. 5 is a diagram showing another manipulated image having trapezoidal right and left manipulated regions.

FIG. 5 shows another example of a manipulated image 90. In this example, a different manipulation routine is used to reshape left and right manipulated regions 92, 94 differently when compared to the example of FIGS. 4A-C. The approaching vehicle 98 is apparently larger and traveling more aligned with the portion of the road 99 shown in the central manipulated region 96. Gridlines are omitted from this figure for clarity.

The manipulated images 80, 90 of FIGS. 4C and 5 are merely illustrative, and manipulated images of other shapes can be generated. The below described manipulated images 100, 110, 110 can equally be used in place of the manipulated image 80, 90 in the above description.

Figure 6:
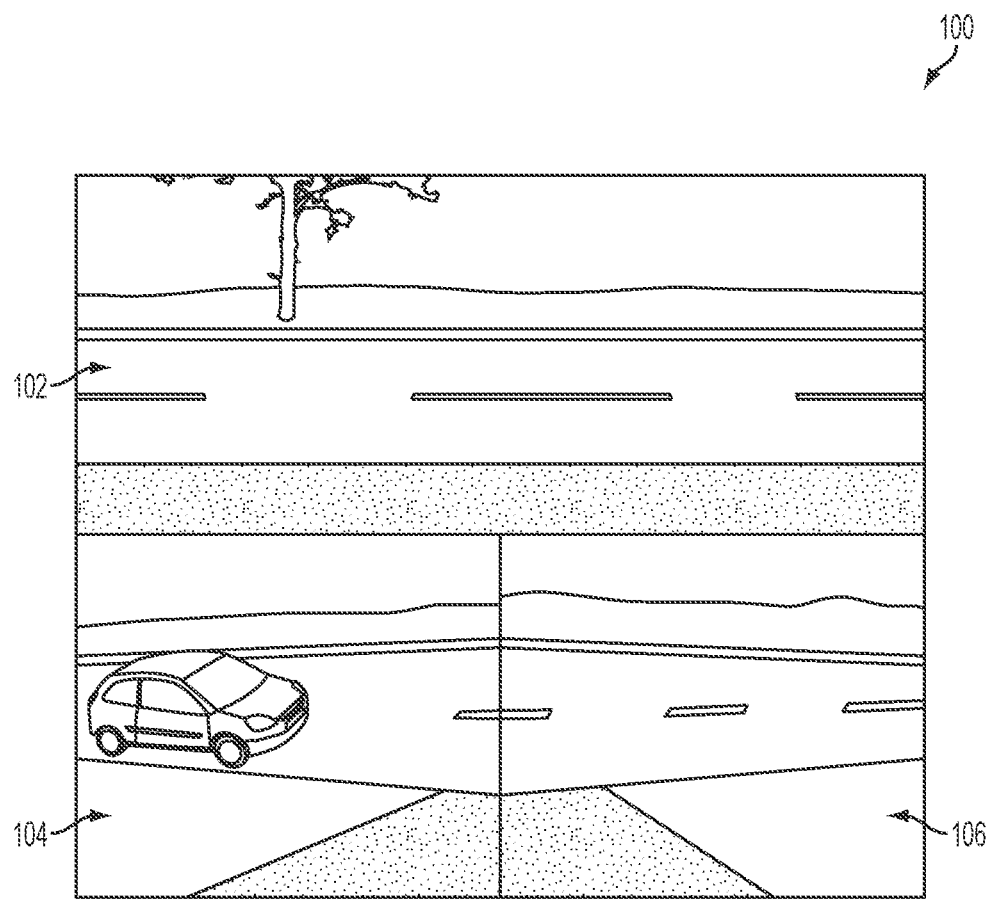
FIG. 6 is a diagram showing a manipulated image having rectangular manipulated regions.

FIG. 6 shows a manipulated image 100 having a rectangular manipulated central region 102 positioned above and spanning the widths of two smaller, rectangular, and mirror-symmetric left and right manipulated regions 104, 106. The image manipulation performed on the central region 70 of the image 60 to obtain the region 102 can include dewarping and reshaping that includes stretching and cropping an upper portion away. The different image manipulation performed on the left and right regions 72, 74 to obtain the regions 104, 106 can include dewarping and reshaping that includes cropping upper portions away.

Figure 7:
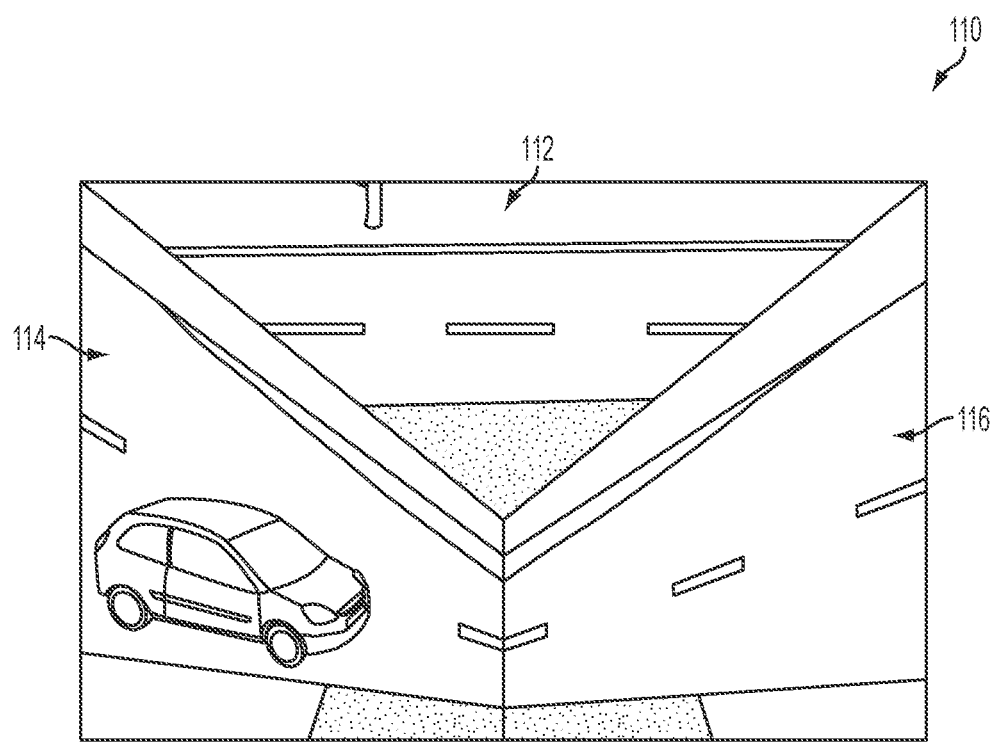
FIG. 7 is a diagram showing a manipulated image having triangular and trapezoidal manipulated regions.

FIG. 7 shows a manipulated image 110 having a triangular manipulated central region 112 positioned above and nested between two smaller, trapezoidal, and mirror-symmetric left and right manipulated regions 114, 116. The image manipulation performed on the central region 70 of the image 60 to obtain the region 112 can include dewarping and reshaping that includes horizontally stretching an upper portion and horizontally compressing a lower portion to obtain the triangular shape as well as cropping an upper portion away. The different image manipulation performed on the left and right regions 72, 74 to obtain the regions 114, 116 can include dewarping and reshaping that includes vertically stretching outer portions and vertically compressing inner portions to obtain the trapezoidal shapes that match the triangular shape of the region 112.

FIG. 8 shows a manipulated image 120 obtained by performing a continuous dewarping manipulation on the entire image 60, which produces a dewarped central region 122 and dewarped left and right regions 124, 126, and by performing reshaping of the left and right regions 72, 74 by stretching to provide image information at the outer corners 129 of the left and right manipulated regions 124, 126. The left and right manipulated regions 124, 126 can be mirror-symmetric. Continuous seams 128 are produced by the continuous dewarping manipulation, and it can be seen that objects in the manipulated image 120 meet at the continuous seams 128 as they do in the original image 60. The continuous seams 128 are not graphically enhanced in this example, but may be visually apparent to the driver due to the shapes of objects in the vicinity of the seams 128.

Figure 9:
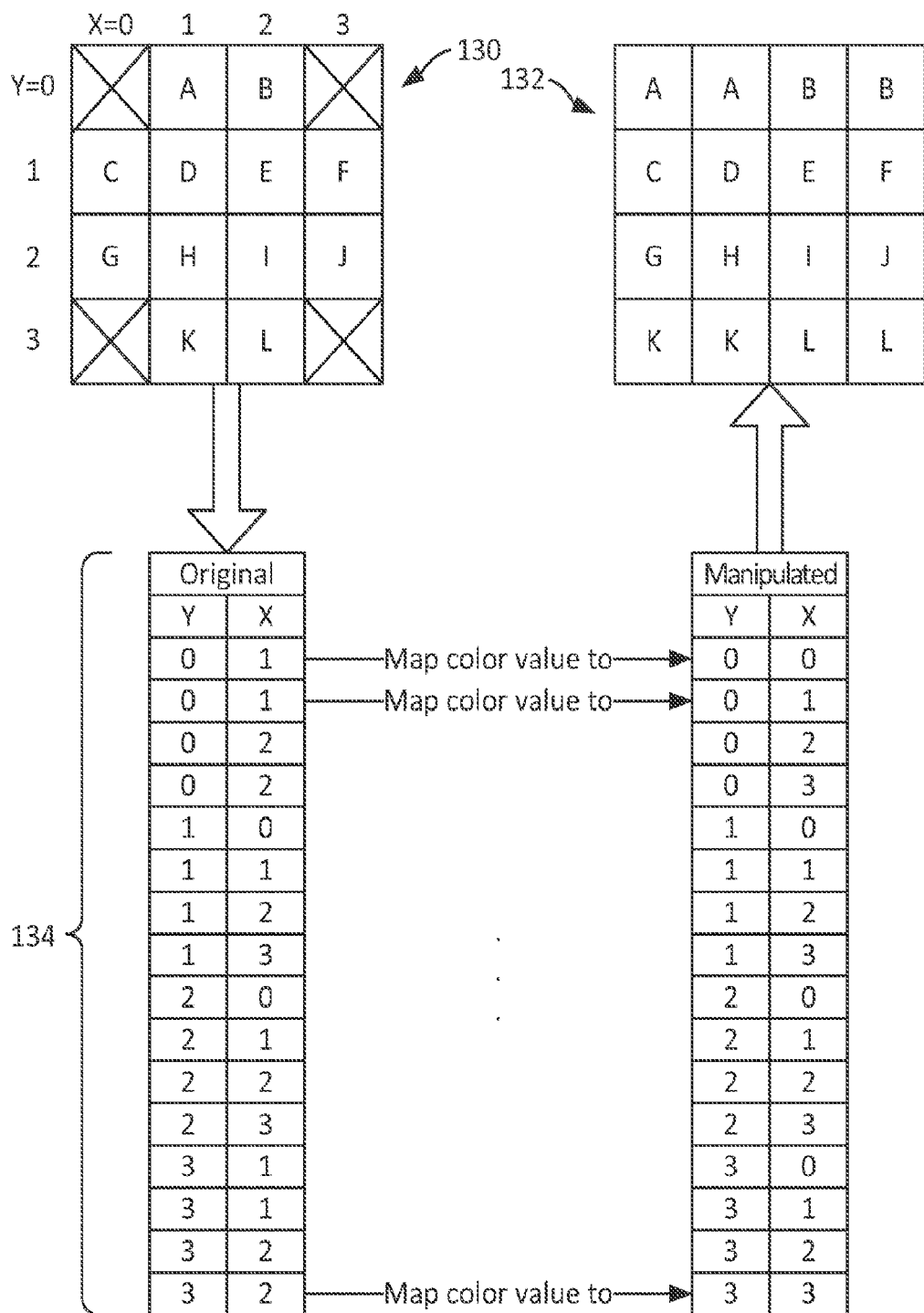
FIG. 9 is a diagram of a remapping table.

FIG. 9 shows a remapping table 134 that correlates X and Y coordinates of source pixels of a source image 130 to X and Y coordinates of destination pixels of a destination image 132. The remapping table 134 allows color values A-L of each source pixel to be set at the X and Y coordinates of a corresponding destination pixel. In this example, the corner pixels of the source image 130 are not used, so the remapping table 134 references color values of neighboring pixels to populate the destination image 132. Although simplified to 16 pixels for explanatory purposes, the remapping table 134 corresponds to a reshaping operation that increases the size of the destination image 132 as well as make the destination image 132 rectangular when compared to the source image 130, which is nominally round. This technique can be used by increasing the number of pixels to achieve any of the image manipulations discussed herein.

The image manipulation and display system of the present invention may utilize aspects of the systems described in U.S. provisional applications, U.S. provisional applications, Ser. No. 61/745,864, filed Dec. 26, 2012; Ser. No. 61/700,617, filed Sep. 13, 2012; and Ser. No. 61/616,855, filed Mar. 28, 2012, which are hereby incorporated herein by reference in their entireties.

According to one aspect of this disclosure, a vehicle camera system includes a camera configured to be positioned on a vehicle, a display configured to be positioned in a cabin of the vehicle, and a processor operatively coupled to the camera and the display. The processor is configured to receive image data from the camera, the image data being representative of an image captured by the camera, and perform a first image manipulation on a first portion of the image data corresponding to a first region of the image to generate first region manipulated image data. The processor is further configured to perform a second image manipulation on a second portion of the image data corresponding to a second region of the image to generate second region manipulated image data. The second region is different from the first region, and the second image manipulation is of a type different from the first image manipulation. The processor is further configured to output to the display manipulated image data including the first region manipulated image data and the second region manipulated image data to cause the display to display a manipulated image based on the manipulated image data. The manipulated image has a first manipulated region corresponding to the first region manipulated image data and a second manipulated region corresponding to the second region manipulated image data.

The first image manipulation can include dewarping.

The second image manipulation can include reshaping, and further, can include dewarping.

The second image manipulation can be configured to move an apparent viewpoint of the camera along a path of travel of the vehicle.

The processor can be further configured to perform a third image manipulation on a third portion of the image data corresponding to a third region of the image to generate third region manipulated image data. The third region is different from the first region and the second region. The third image manipulation is of a same type as the second image manipulation. The manipulated image data includes the third region manipulated image data, which corresponds to a third manipulated region that forms part of the manipulated image.

The third region of the image can have a shape that is mirror-symmetric to a shape of the second region of the image.

The third manipulated region of the manipulated image can have a shape that is mirror-symmetric to a shape of the second manipulated region of the manipulated image.

The first region can be a central region, the second region can be a left region, and the third region can be a right region of a scene captured by the camera.

The manipulated image can include a generally discontinuous seam between the first manipulated region and the second manipulated region.

The processor can be configured to graphically enhance the discontinuous seam.

The image data can be representative of at least a frame of video captured by the camera.

The camera can include a wide-angle lens.

The processor can be configured to generate the manipulated image based on image data received from only the camera.

The camera can be configured to be rear-facing on the vehicle.

The camera can be configured to be forward-facing on the vehicle.

The manipulated image can include substantially the entire horizontal field of view of the camera.

According to another aspect of this disclosure, a vehicle camera system includes a camera configured to be positioned on a vehicle, a display configured to be positioned in a cabin of the vehicle, and a processor operatively coupled to the camera and the display. The processor is configured to manipulate an image received from the camera to generate a manipulated image. Pixels of a central region of the image are manipulated by a different type of manipulation than pixels of left and right regions of the image. The pixels of the left and right regions of the image are manipulated symmetrically about a vertical axis central to the central region.

According to another aspect of this disclosure, a method includes capturing an image with a camera positioned on a vehicle, performing a first image manipulation on a first region of the image to generate a first manipulated region, and performing a second image manipulation on a second region of the image to generate a second manipulated region. The second region is different from the first region. The second image manipulation is of a type different from the first image manipulation. The method further includes displaying a manipulated image including the first manipulated region and the second manipulated region.

The first image manipulation can include dewarping.

The second image manipulation can include reshaping, and further, can include dewarping.

The second image manipulation can be configured to move an apparent viewpoint of the camera along a path of travel of the vehicle.

The method can further include performing a third image manipulation on a third region of the image to generate a third manipulated region. The third region is different from the first region and the second region. The third image manipulation is of a same type as the second image manipulation. The manipulated image further includes the third manipulated region.

The third region of the image can have a shape that is mirror-symmetric to a shape of the second region of the image.

The third manipulated region of the manipulated image can have a shape that is mirror-symmetric to a shape of the second manipulated region of the manipulated image.

The first region can be a central region, the second region can be a left region, and the third region can be a right region of a scene captured by the camera.

The manipulated image can include a generally discontinuous seam between the first manipulated region and the second manipulated region.

The method can further include graphically enhancing the discontinuous seam.

The image can be a frame of video captured by the camera.

The image can be captured with only the camera.

The manipulated image can include substantially the entire horizontal field of view of the camera.

The camera or cameras may include or may be associated with an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, and published on Jun. 6, 2013 as International Publication No. WO 2013/081985, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published on Feb. 7, 2013 as International Publication No. WO 2013/019707, and/or PCT Application No. PCT/US2012/048110, filed Jul. 25, 2012, and published on Jan. 31, 2013 as International Publication No. WO 2013/016409, and/or PCT Application No. PCT/CA2012/000378, filed Apr. 25, 2012, and published Nov. 1, 2012 as International Publication No. WO 2012/145822, and/or PCT Application No. PCT/US2012/056014, filed Sep. 19, 2012, and published Mar. 28, 2013 as International Publication No. WO 2013/043661, and/or PCT Application No. PCT/US12/57007, filed Sep. 25, 2012, and published Apr. 4, 2013 as International Publication No. WO 2013/048994, and/or PCT Application No. PCT/US2012/061548, filed Oct. 24, 2012, and published on May 2, 2013 as International Publication No. WO 2013/063014, and/or PCT Application No. PCT/US2012/062906, filed Nov. 1, 2012, and published May 1, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2012/071219, filed Dec. 21, 2012, and published Jul. 11, 2013 as International Publication No. WO 2013/103548, and/or PCT Application No. PCT/US2013/022119, filed Jan. 18, 2013, and published Jul. 25, 2013 as International Publication No. WO 2013/109869, and/or PCT Application No. PCT/US2013/026101, filed Feb. 14, 2013, and published Aug. 22, 2013 as International Publication No. WO 2013/123161, and/or U.S. patent application Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/766,883, filed Feb. 20, 2013; Ser. No. 61/760,368, filed Feb. 4, 2013; Ser. No. 61/760,364, filed Feb. 4, 2013; Ser. No. 61/758,537, filed Jan. 30, 2013; Ser. No. 61/754,8004, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,876, filed Feb. 24, 2012; and/or Ser. No. 61/601,651, filed Feb. 22, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published on Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and published on Feb. 7, 2013 as International Publication No. WO 2013/019795, and/or PCT Application No. PCT/US11/62755, filed Dec. 1, 2011 and published Jun. 7, 2012 as International Publication No. WO 2012/075250, and/or PCT Application No. PCT/CA2012/000378, filed Apr. 25, 2012, and published on Nov. 1, 2012 as International Publication No. WO 2012/145822, and/or PCT Application No. PCT/US2012/066571, filed Nov. 27, 2012, and published Jun. 6, 2013 as International Publication No. WO 2013/081985, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the foregoing provides certain non-limiting example embodiments, it should be understood that combinations, subsets, and variations of the foregoing are contemplated. The monopoly sought is defined by the claims.

The invention claimed is:

1. A vehicular vision system, said vehicular vision system comprising:
a camera disposed at a front portion of a vehicle, wherein said camera has a forward field of view of at least 180 degrees so as to capture image data representative of a view of cross traffic when the vehicle is at an intersection;
a display screen disposed in a cabin of the vehicle and viewable by a driver of the vehicle;
a processor disposed at the vehicle for processing image data captured by said camera;
wherein image data captured by said camera is representative of the view of said camera;
wherein image data captured by said camera is provided to said processor;
wherein said processor processes the provided captured image data;
wherein said processor processes the provided captured image data via a first image manipulation of a first portion of the provided captured image data that corresponds to a first region of the view of said camera to generate first region manipulated image data;
wherein said processor processes the provided captured image data via a second image manipulation of a second portion of the provided captured image data that corresponds to a second region of the view of said camera to generate second region manipulated image data, the second region being different from the first region;
wherein said processor processes the provided captured image data via a third image manipulation of a third portion of the provided captured image data that corresponds to a third region of the view of said camera to generate third region manipulated image data, the third region being different from the first region and being different from the second region;
wherein the first region comprises a central region of the view of said camera, the second region comprises a left region of the view of said camera, and the third region comprises a right region of the view of said camera;
wherein said processor generates manipulated image data that comprises the first region manipulated image data, the second region manipulated image data and the third region manipulated image data;
wherein, responsive to the generated manipulated image data, said display screen displays images based at least in part on the generated manipulated image data, and wherein the displayed images include (i) a first image at a first display region of said display screen, the first image at least partially derived from the first region manipulated image data, (ii) a second image at a second display region of said display screen, the second image at least partially derived from the second region manipulated image data and (iii) a third image at a third display region of said display screen, the third image at least partially derived from the third region manipulated image data;
wherein the displayed images are discontinuous at a first seam between the first display region and the second display region such that an object present in both the first and second regions of the view of said camera is displayed as discontinuous at the first seam;
wherein the displayed images are discontinuous at a second seam between the first display region and the third display region such that an object present in both the first and third regions of the view of said camera is displayed as discontinuous at the second seam; and
wherein, with the vehicle moving and approaching a cross traffic situation where an approaching vehicle is approaching a path of travel of the vehicle, the second image is representative of the approaching vehicle and the second image manipulation comprises selecting a manipulation technique based on the approaching vehicle and manipulating, using the selected manipulation technique, the second portion of the provided captured image data to move an apparent viewpoint of the camera along the path of travel of the vehicle and to enlarge the second image representative of the approaching vehicle at the second display region of said display screen compared to the first image at the first display region of said display screen.

2. The vehicular vision system of claim 1, wherein the second and third image manipulations comprise reshaping.

3. The vehicular vision system of claim 1, wherein said vehicular vision system, responsive to detection of cross traffic at the intersection, performs the second image manipulation to move the apparent viewpoint along the path of travel of the vehicle when the vehicle is at the intersection.

4. The vehicular vision system of claim 1, wherein the second image manipulation is different from the first image manipulation, and wherein the third image manipulation is different from the first image manipulation.

5. The vehicular vision system of claim 4, wherein the third image manipulation is of a same type as the second image manipulation.

6. The vehicular vision system of claim 1, wherein the third display region has a shape that is mirror-symmetric to a shape of the second display region.

7. The vehicular vision system of claim 1, wherein the first seam comprises a first vertical seam between the first display region and the second display region, and wherein the second seam comprises a second vertical seam between the first display region and the third display region.

8. The vehicular vision system of claim 7, wherein said processor graphically enhances the first vertical seam between the first display region and the second display region and graphically enhances the second vertical seam between the first display region and the third display region.

9. The vehicular vision system of claim 1, wherein said processor graphically enhances the first and second seams.

10. The vehicular vision system of claim 1, wherein the provided captured image data is representative of at least a frame of video captured by said camera.

11. The vehicular vision system of claim 1, wherein said camera includes a wide-angle lens.

12. The vehicular vision system of claim 1, wherein the manipulated image data generated by said processor is based on image data received from only said camera.

13. The vehicular vision system of claim 1, wherein the second and third image manipulations provide a different viewpoint as compared to a viewpoint provided via the first image manipulation.

14. The vehicular vision system of claim 13, wherein the different viewpoint provided by the second and third image manipulations comprises the apparent viewpoint that is moved along the path of travel of the vehicle relative to the viewpoint provided via the first image manipulation.

15. The vehicular vision system of claim 1, wherein the generated manipulated image data is provided by said processor to said display screen.

16. A vehicular vision system, said vehicular vision system comprising:
- a camera disposed at a front portion of a vehicle, wherein said camera has a forward field of view of at least 180 degrees so as to capture image data representative of a view of cross traffic when the vehicle is at an intersection;
- a display screen disposed in a cabin of the vehicle and viewable by a driver of the vehicle;
- a processor disposed at the vehicle for processing image data captured by said camera;
- wherein image data captured by said camera is representative of the view of said camera;
- wherein image data captured by said camera is provided to said processor;
- wherein said processor processes the provided captured image data;
- wherein said processor processes the provided captured image data via a first image manipulation of a first portion of the provided captured image data that corresponds to a first region of the view of said camera to generate first region manipulated image data;
- wherein said processor processes the provided captured image data via a second image manipulation of a second portion of the provided captured image data that corresponds to a second region of the view of said camera to generate second region manipulated image data, the second region being different from the first region;
- wherein said processor processes the provided captured image data via a third image manipulation of a third portion of the provided captured image data that corresponds to a third region of the view of said camera to generate third region manipulated image data, the third region being different from the first region and being different from the second region;
- wherein the second image manipulation is different from the first image manipulation;
- wherein the second and third image manipulations provide respective different viewpoints as compared to a viewpoint provided via the first image manipulation;
- wherein the first region comprises a central region of the view of said camera, the second region comprises a left region of the view of said camera, and the third region comprises a right region of the view of said camera;
- wherein said processor generates manipulated image data that comprises the first region manipulated image data, the second region manipulated image data and the third region manipulated image data;
- wherein, responsive to the generated manipulated image data, said display screen displays images based at least in part on the generated manipulated image data, and wherein the displayed images include (i) a first image at a first display region of said display screen, the first image at least partially derived from the first region manipulated image data, (ii) a second image at a second display region of said display screen, the second image at least partially derived from the second region manipulated image data and (iii) a third image at a third display region of said display screen, the third image at least partially derived from the third region manipulated image data;
- wherein, with the vehicle moving and approaching a cross traffic situation where an approaching vehicle is approaching a path of travel of the vehicle, the second image is representative of the approaching vehicle and the second image manipulation comprises selecting a manipulation technique based on the approaching vehicle and manipulating, using the selected manipulation technique, the second portion of the provided captured image data to move an apparent viewpoint of the camera along the path of travel of the vehicle and to enlarge the second image representative of the approaching vehicle at the second display region of said display screen compared to the first image at the first display region of said display screen;
- wherein, with the vehicle moving and approaching the cross traffic situation, the third image manipulation comprises manipulating the third portion of the provided captured image data to move the apparent viewpoint of the camera along the path of travel of the vehicle and to enlarge the third image at the third display region of said display screen compared to the first image at the first display region of said display screen;
- wherein the displayed images are discontinuous at a first seam between the first display region and the second display region such that an object present in both the first and second regions of the view of said camera is displayed as discontinuous at the first seam; and
- wherein the displayed images are discontinuous at a second seam between the first display region and the third display region such that an object present in both the first and third regions of the view of said camera is displayed as discontinuous at the second seam.

17. The vehicular vision system of claim 16, wherein the second and third image manipulations comprise reshaping.

18. The vehicular vision system of claim 16, wherein the first seam comprises a vertical seam between the first display region and the second display region, and wherein the second seam comprises a vertical seam between the first display region and the third display region.

19. The vehicular vision system of claim 16, wherein said processor graphically enhances the first and second seams.

20. The vehicular vision system of claim 16, wherein said camera includes a wide-angle lens.

21. The vehicular vision system of claim 16, wherein the manipulated image data generated by said processor is based on image data received from only said camera.

22. The vehicular vision system of claim 16, wherein the different viewpoint provided by the second and third image manipulations comprises the apparent viewpoint that is moved along the path of travel of the vehicle relative to the viewpoint provided via the first image manipulation.

23. The vehicular vision system of claim 16, wherein the generated manipulated image data is provided by said processor to said display screen.

24. A vehicular vision system, said vehicular vision system comprising:
- a camera disposed at a front portion of a vehicle, wherein said camera has a forward field of view of at least 180 degrees so as to capture image data representative of a view of cross traffic when the vehicle is at an intersection;
- a display screen disposed in a cabin of the vehicle and viewable by a driver of the vehicle;
- a processor disposed at the vehicle for processing image data captured by said camera;
- wherein image data captured by said camera is representative of the view of said camera;

wherein image data captured by said camera is provided to said processor;

wherein said processor processes the provided captured image data;

wherein said processor processes the provided captured image data via a first image manipulation of a first portion of the provided captured image data that corresponds to a first region of the view of said camera to generate first region manipulated image data;

wherein said processor processes the provided captured image data via a second image manipulation of a second portion of the provided captured image data that corresponds to a second region of the view of said camera to generate second region manipulated image data, the second region being different from the first region;

wherein said processor processes the provided captured image data via a third image manipulation of a third portion of the provided captured image data that corresponds to a third region of the view of said camera to generate third region manipulated image data, the third region being different from the first region and being different from the second region;

wherein the second and third image manipulations provide respective different viewpoints as compared to a viewpoint provided via the first image manipulation;

wherein the different viewpoints of said camera provided by the second and third image manipulations comprises an apparent viewpoint that is moved along a path of travel of the vehicle relative to the viewpoint provided via the first image manipulation;

wherein the first region comprises a central region of the view of said camera, the second region comprises a left region of the view of said camera, and the third region comprises a right region of the view of said camera;

wherein said processor generates manipulated image data that comprises the first region manipulated image data, the second region manipulated image data and the third region manipulated image data;

wherein the generated manipulated image data is provided by said processor to said display screen;

wherein, responsive to the generated manipulated image data, said display screen displays images based at least in part on the generated manipulated image data, and wherein the displayed images include (i) a first image at a first display region of said display screen, the first image at least partially derived from the first region manipulated image data, (ii) a second image at a second display region of said display screen, the second image at least partially derived from the second region manipulated image data and (iii) a third image at a third display region of said display screen, the third image at least partially derived from the third region manipulated image data;

wherein, with the vehicle moving and approaching a cross traffic situation where an approaching vehicle is approaching a path of travel of the vehicle, the second image is representative of the approaching vehicle and the second image manipulation comprises selecting a manipulation technique based on the approaching vehicle and manipulating, using the selected manipulation technique, the second portion of the provided captured image data to move the apparent viewpoint of the camera along the path of travel of the vehicle and to enlarge the second image representative of the approaching vehicle at the second display region of said display screen compared to the first image at the first display region of said display screen;

wherein, with the vehicle moving and approaching the cross traffic situation, the third image manipulation comprises manipulating the third portion of the provided captured image data to move the apparent viewpoint of the camera along the path of travel of the vehicle and to enlarge the third image at the third display region of said display screen compared to the first image at the first display region of said display screen;

wherein the displayed images are discontinuous at a first vertical seam between the first display region and the second display region such that an object present in both the first and second regions of the view of said camera is displayed as discontinuous at the first vertical seam; and wherein the displayed images are discontinuous at a second vertical seam between the first display region and the third display region such that an object present in both the first and third regions of the view of said camera is displayed as discontinuous at the second vertical seam.

25. The vehicular vision system of claim 24, wherein the second image manipulation is different from the first image manipulation, and wherein the third image manipulation is different from the first image manipulation.

26. The vehicular vision system of claim 25, wherein the third image manipulation moves the apparent viewpoint the same as the second image manipulation.

27. The vehicular vision system of claim 24, wherein said processor graphically enhances the first and second vertical seams.

28. The vehicular vision system of claim 24, wherein the provided captured image data is representative of at least a frame of video captured by said camera.

29. The vehicular vision system of claim 24, wherein said camera includes a wide-angle lens.

30. The vehicular vision system of claim 24, wherein the manipulated image data generated by said processor is based on image data received from only said camera.

* * * * *